United States Patent [19]

Yocum et al.

[11] Patent Number: 5,310,143
[45] Date of Patent: May 10, 1994

[54] THREE AXIS THRUSTER MODULATION

[75] Inventors: John F. Yocum; Dan Y. Liu, both of Rancho Palos Verdes; Richard A. Fowell, Culver City; Douglas J. Bender, Redondo Beach, all of Calif.

[73] Assignee: Hughes Aircraft Company, Los Angeles, Calif.

[21] Appl. No.: 75,843

[22] Filed: Jun. 10, 1993

Related U.S. Application Data

[63] Continuation of Ser. No. 800,658, Nov. 27, 1991, abandoned.

[51] Int. Cl.[5] .............................................. B64G 1/24
[52] U.S. Cl. ................................. 244/164; 244/169; 364/459; 364/434
[58] Field of Search ............... 244/164, 169; 364/459, 364/433, 434

[56] References Cited

U.S. PATENT DOCUMENTS

| | | | |
|---|---|---|---|
| 4,567,564 | 1/1986 | Bittner et al. | 364/434 |
| 4,599,697 | 7/1986 | Chan | 364/434 |
| 4,725,024 | 2/1988 | Vorlicek | 244/164 |
| 4,848,706 | 7/1989 | Garg et al. | 244/169 |
| 4,961,551 | 10/1990 | Rosen | 244/164 |
| 5,130,931 | 7/1992 | Paluszek et al. | 364/459 |

OTHER PUBLICATIONS

Vaeth, Compatibility of Impulse Modulation Techniques with Attitude Sensor Noise and Spacecraft Maneuvering, IEEE Trans. on Automatic Control, Jan. 1965, p.p. 67 et seq.

Primary Examiner—Margaret A. Focarino
Assistant Examiner—Christopher P. Ellis
Attorney, Agent, or Firm—Gordon R. Lindeen, III; William J. Streeter; Wanda Denson-Low

[57] ABSTRACT

The three axes thruster modulation (8) of the present invention accepts three axes of input torque commands or angular acceleration commands and generates thruster selection and thruster timing (40) information which is used to fire thrusters (48) for the purpose of spacecraft attitude control and velocity change maneuvers. The modulation logic (8) works in all three axes simultaneously and is suitable for use with an arbitrary thruster configuration, including a configuration in which individual thrusters or thruster groups do not produce torques about mutually orthogonal axes. After thruster selection and on-times have been determined, the modulation logic (8) uses this information to compute a best estimate of the actual rate change (42) which is then compared to the commanded rate change (44) to develop a residual unfired rate change. The residual unfired rate change is retained and fed forward for addition to the subsequent acceleration command in computing the commanded rate change for the subsequent sample period (10, 20, 30). As a result, all commanded rate changes will ultimately be fired even if the commanded rate change is below a minimum rate change achievable.

19 Claims, 3 Drawing Sheets

THREE AXIS THRUSTER MODULATION

This is a continuation of application Ser. No. 07/800,658, filed Nov. 27, 1991, abandoned.

BACKGROUND OF THE INVENTION

1. Field of the Invention

The present invention relates to a three axis thruster modulation logic for control of a spacecraft.

2. Description of Related Art

Previous methods for modulating thrusters have been described in the literature and generally referred to as "derived rate controller", "pseudo rate modulator", or "pulse width/pulse frequency modulator". There are a variety of implementations but they always contain an off/on non-linearity with deadband and hysteresis. Bittner, in U.S. Pat. No. 4,567,564, refers to this as a "relay" function. Typically, there is a feedback loop, with a first order filter, wrapped around the non-linear function. The filtered signal, being fedback, serves as a derived estimate of the spacecraft rate as it responds to the thruster firing. This signal is used to shut the firing down when the rate estimate is sufficiently large. Pointing control amplitude is controlled by adjusting the width of the deadband. Pulse frequency, and hence excitation of flexible spacecraft modes, is indirectly controlled by adjusting the hysteresis value and the time constant of the feedback path. These methods are well known to those practicing three axis spacecraft control. They are all based on analog logic to modulate a set of jets for control about a single axis. Digital implementation is alluded to, but constitutes a digitalized version of the analog logic rather than an inherently digital design.

Another disadvantage of the pseudo rate modulator is that its low amplitude response is very non-linear. At some level its output is zero, for low amplitudes it simply does not fire. This characteristic has not been a significant problem when using low level thrusters, such as thrusters with a minimum impulse of approximately 0.004 lb-sec., but becomes more of a problem when using 5 lb thrusters, with a minimum impulse of approximately 0.09 lb-sec. By contrast, the approach of this invention produces a proportional thrust impulse at any non zero level of input although it does introduce some lag time as the level becomes very low. The disadvantage associated with the lag can be overcome with a fractional modulation scheme, described later.

Bittner improves on the pseudo rate modulator in a number of ways. Bittner eliminates the filtering in the feedback path around the non-linearity by feeding the derived rate information directly back to the state estimator where it alters the estimates of rate and position. Bittner also describes additional complexity in which the deadband and hysteresis are adjusted adaptively, based on observed pointing error, amplitude of low frequency oscillations and/or derived disturbance torque levels. This complexity can be used to adjust frequency of pulsing and thereby avoid excitation of certain spacecraft structural resonances. Bittner's improvements are still confined to a single axis and are based on analog logic although Bittner discusses how to digitally mimic this logic.

Garg, in U.S. Pat. No. 4,848,706, extends use of the same type of modulator to a spacecraft where the torques produced by thrusters are not restricted to be orthogonal but the thrusters must still be arranged in groups with some thrusters of a group producing a torque opposite of that produced by the other thrusters in the group. He divides the thrusters into three groups with torque vectors not necessarily being orthogonal, then maps the control torque commands into components along the three thruster torque axes and finally applies the same pulse width/pulse frequency modulator to each thruster group. With this approach, Garg is able to achieve a minimum set of twelve thrusters per spacecraft as compared to a minimum of ten thrusters achieved by the present invention.

SUMMARY OF THE INVENTION

In a spacecraft control loop using thrusters, one important function is that of converting control loop torque commands into thruster selection and fire time commands. In most three axis control systems, this function has been accomplished with some sort of pulse modulator. The present invention provides a new method for pulse modulation of thrusters. The pulse modulation logic accepts three axis of input torque commands (or angular acceleration commands), and generates thruster selection and thruster timing information which can be used to fire thrusters for the purpose of attitude control and velocity change maneuvers. The three input angular acceleration commands are typically generated by onboard attitude information and control algorithms.

The pulse modulation logic of the present invention is novel in that it works in all three axes simultaneously and is suitable for use with an arbitrary thruster configuration, including a configuration in which individual thrusters or thruster pairs do not produce torques about mutually orthogonal axes. The method is also designed to make the thrusters' torquing response to an input command as linear as possible, consistent with thrust level and thruster minimum impulse capability. This latter characteristic is an important feature which facilitates stabilization of a flexible spacecraft when using thrusters with large minimum impulse bits.

It is an object of the invention to convert three axis control angular acceleration commands into thruster selection and on time commands such that: 1) the command accelerations are achieved on the average; and 2) the transmission from command angular acceleration to achieved angular acceleration is as linear as possible consistent with the maximum allowable thruster pulse frequency, thrust level and thruster minimum impulse capability. The approach of the present invention is inherently digital, works on three axes simultaneously and is applicable to any fully controllable three axes thruster configuration. It is superior to the approach of Garg in that it achieves equivalent results when thrusters are arranged in pairs, but is also applicable to a spacecraft layout where no restrictions are laid on thruster placement except that the thrusters provide full three axis torquing capability. By maintaining near linearity even at very low levels, this approach allows application of the tools of linear analysis to achieve pointing and structural stability rather than indirect tuning of deadbands and hysteresis levels to adjust pulse frequency and thereby avoid excitation of spacecraft structural resonances.

Further objects, features and advantages of the invention will become apparent from a consideration of the following description and the appended claims when taken in connection with the accompanying drawings.

DETAILED DESCRIPTION OF THE INVENTION

Figure 1A:
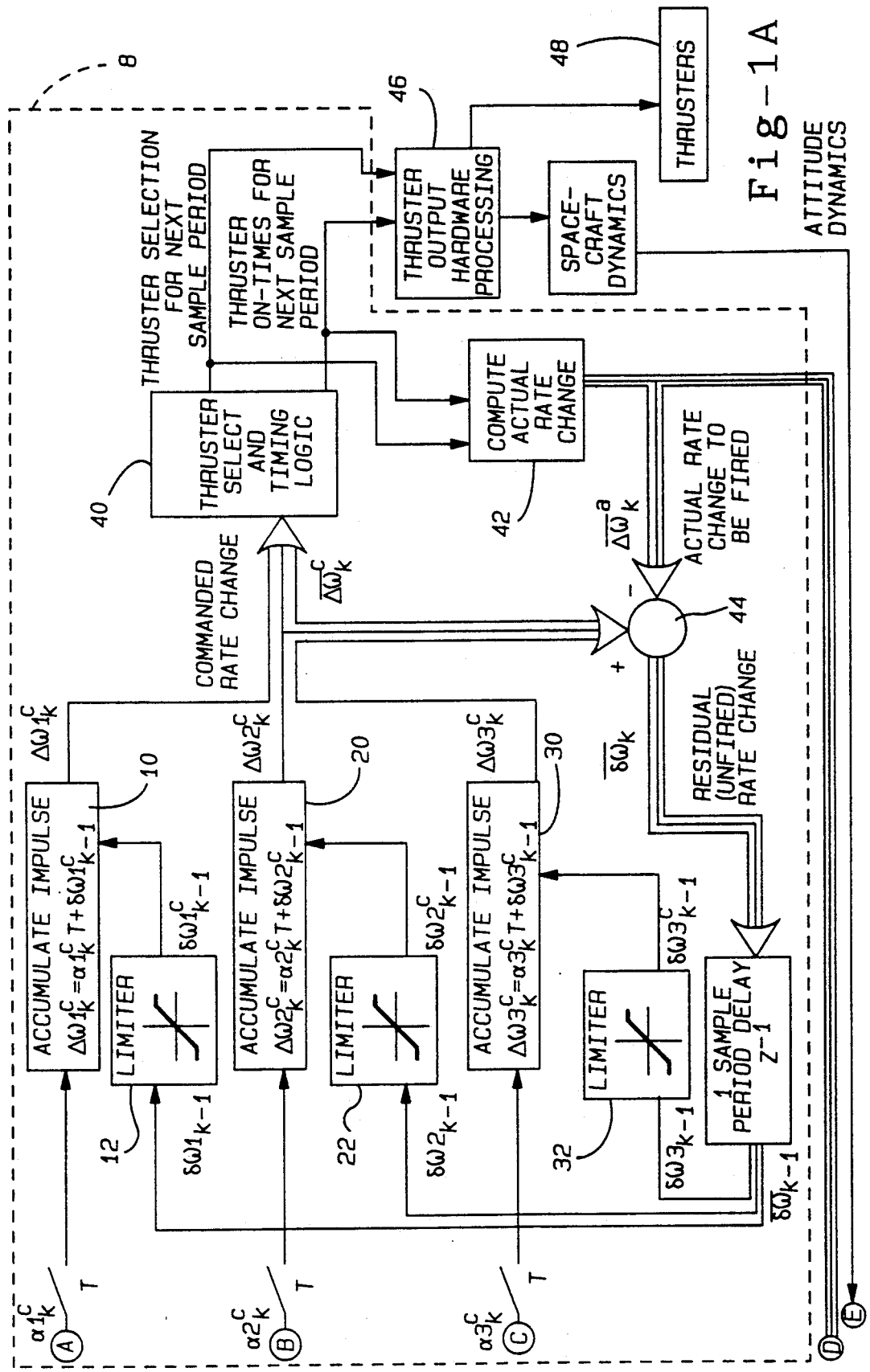
FIGS. 1A and 1B are schematic drawings showing a spacecraft controller with an emphasis on the three axis modulation logic of the present invention with FIG. 1A illustrating the right half of the schematic and FIG. 1B illustrating the left half of the schematic.

The three axis thruster modulation logic of the present invention is illustrated in FIG. 1A within the block 8. The modulation logic accepts as input, three angular acceleration commands, one for each axis of control, $\alpha 1^c_k$, $\alpha 2^c_k$ and $\alpha 3^c_k$ where the numerals 1, 2 and 3 designate the axis, the superscript c designates "command" and the subscript k designates a particular sample period. The acceleration commands are produced by three controllers 50, 52 and 54 shown in FIG. 1B and discussed further below. The method of operation of the controllers is the subject of a commonly assigned application entitled "Method for Stationkeeping Control of Flexible Spacecraft Using Onboard Gain Scheduling" naming John Yocum and Dan Liu as inventors, the teachings of which are incorporated herein by reference.

The purpose of the modulation logic is to select appropriate thrusters and compute thruster on-time commands which will produce the angular accelerations as commanded. The logic is designed for digital implementation and thus assumes all operations occur repetitively at some sample period of T duration. The modulation logic, in the boxes 10, 20 and 30 labeled "Accumulate Impulse", multiplies each angular acceleration command by the sample period duration T to convert acceleration into an equivalent rate change for the upcoming sample period. To the rate change, the logic adds any residual unfired rate change $\delta\omega 1^c_{k-1}$, $\delta\omega 2^c_{k-1}$ and $\delta\omega 3^c_{k-1}$ from the prior sample time period $k-1$. The result represents the rate change commands $\Delta\omega 1^c_k$, $\Delta\omega 2^c_k$ and $\Delta\omega 3^c_k$ which should be executed in the next sample period k. These rate change commands for all three axes, $\Delta\omega^c_k$, are input to the Thruster Select and Timing Logic (TSTL) 40, whose function it is to: 1) determine which thrusters to select to achieve the rate change commanded; and 2) compute the on-time durations for each of the selected thrusters.

There are many ways to accomplish the TSTL function and the precise method used is not part of the present invention. The TSTL function is, for a general thruster configuration, a difficult task. It requires knowledge of spacecraft mass properties, thruster placement and alignment relative to spacecraft center of mass, and thruster physical constraints such as minimum on-time and impulse versus on-time characteristics. For typical thruster configurations, there is usually more than one thruster combination possible which will provide a given control torque. Thus, some sort of decision process is required.

In the preferred embodiment of the TSTL, an algorithm based on linear programming is employed to optimally select thrusters which minimize the total thruster on-time, and hence, total fuel consumption. The TSTL algorithm, while utilizing information about spacecraft mass properties, thruster placement and thruster alignment relative to spacecraft center of mass, assumes an ideal proportional relationship between force impulse and on-time.

The resulting ideal computed on-times are adjusted to compensate for thruster losses at the start of each pulse, then further adjusted to avoid commanding thruster on-times longer than the control logic sample period or shorter than some minimum corresponding to the minimum repeatable impulse capability of the thrusters. Non-optimal table driven algorithms are also possible.

It should be noted that, in the special case when thrusters are mounted to produce three mutually orthogonal torque vectors, each using a different set of thrusters, TSTL reduces to three simple uncoupled single axis problems. This is the case utilized in many prior art spacecraft control systems using the "Pseudo-Rate Modulator".

Although the exact algorithm in the TSTL is not important to the present invention, it is assumed that the TSTL function includes the following capabilities: 1) it uses spacecraft mass properties together with thruster placement and alignment information to select thrusters and compute necessary on-time commands; 2) on-times smaller than some minimum determined by thruster performance characteristics are truncated or rounded to either zero or the minimum allowable; 3) on-times greater than the sample period are truncated to less than or equal to the sample period; 4) to perform velocity change maneuvers, the TSTL must have the ability to command certain thrusters, designated by ground control, to a full on-state with off pulsing for attitude control; and 5) it must include logic to choose between redundant thrusters which are capable of performing equivalent torquing.

One of the functions performed by the TSTL is to decide if a computed on-time is large enough to be fired. If it is too small, the TSTL must choose not to fire. This is analogous to the deadband incorporated in the "Pseudo-Rate Modulator". There is, however, nothing in the present invention similar to the hysteresis in the "Pseudo-Rate Modulator".

After the TSTL algorithm has selected thrusters and computed on-time commands, the modulation logic uses this information to compute a best estimate of the actual rate change that corresponds to the selected thrusters and respective on-times. This calculation is shown at block 42. Ideally, the actual rate change estimate would be identical to the commanded rate change. In practice however, it may differ for a number of reasons. As already mentioned, if the commanded rate change produces an on-time below the minimum allowable for a given thruster, then that thruster will not be fired at all. On the other hand, if a thruster on-time greater than the sample period is necessary, then the thruster can be fired at most for the entire sample period. A longer firing is of course possible, but not in the current sample period. Approximations in the TSTL algorithm are still another source of potential differences between the commanded rate change and the actual rate change estimate.

The actual rate change estimate $\overline{\Delta\omega_k^a}$ is subtracted from the commanded rate change $\overline{\Delta\omega_k^c}$ at 44 to obtain a residual, or unfired rate change $\overline{\delta\omega_k}$. This residual is held over for a sample period, passed through a limiter 12, 22 or 32 and added back in at the next opportunity. The function of the limiters is to preclude "wind up" which might otherwise occur when a large acceleration command is input. By setting the limit at or slightly below the impulse achievable in a single sample period, the logic achieves a saturation effect with no "wind up". No matter how big or how long a saturating acceleration command is input, the logic will always come out of saturation within one sample period after the acceleration command drops below a saturated level.

The thruster selection and thruster on-times from the TSTL are directed to the thruster output Hardware Processing 46 which then commands the thrusters 48 to fire. The firing of the thrusters will, of course, affect the spacecraft dynamics and attitude which will be detected by the Inertial Reference Unit and Earth Sensor as shown in FIGS. 1A and 1B.

The three axis thruster modulation incorporates features that allow it to closely approximate a proportional control. One such feature is the feed back path which injects the residual unfired rate change into the command. The residual represents that portion of a rate change command that was not executed in the prior sample period. This feature precludes loss of a command too small to be fired on a given sample period, by adding it to the next fire command. If the resulting sum is large enough to be fired, it will be fired. For example, suppose an input acceleration command was constant at a level such that the thruster impulse required to implement it is half a minimum impulse bit every sample period. While the "Pseudo-Rate Modulator" would simply never fire, the logic of this invention will fire every other sample period and accumulate an unfired impulse on the alternate sample periods. A similar performance enhancement is often obtained for larger pulses as well, for even large impulses in an arbitrary direction often result in small thruster impulse bits in nondominant thrusters. The feedback path guarantees that such small rate change commands will be fired in due course.

Figure 2:
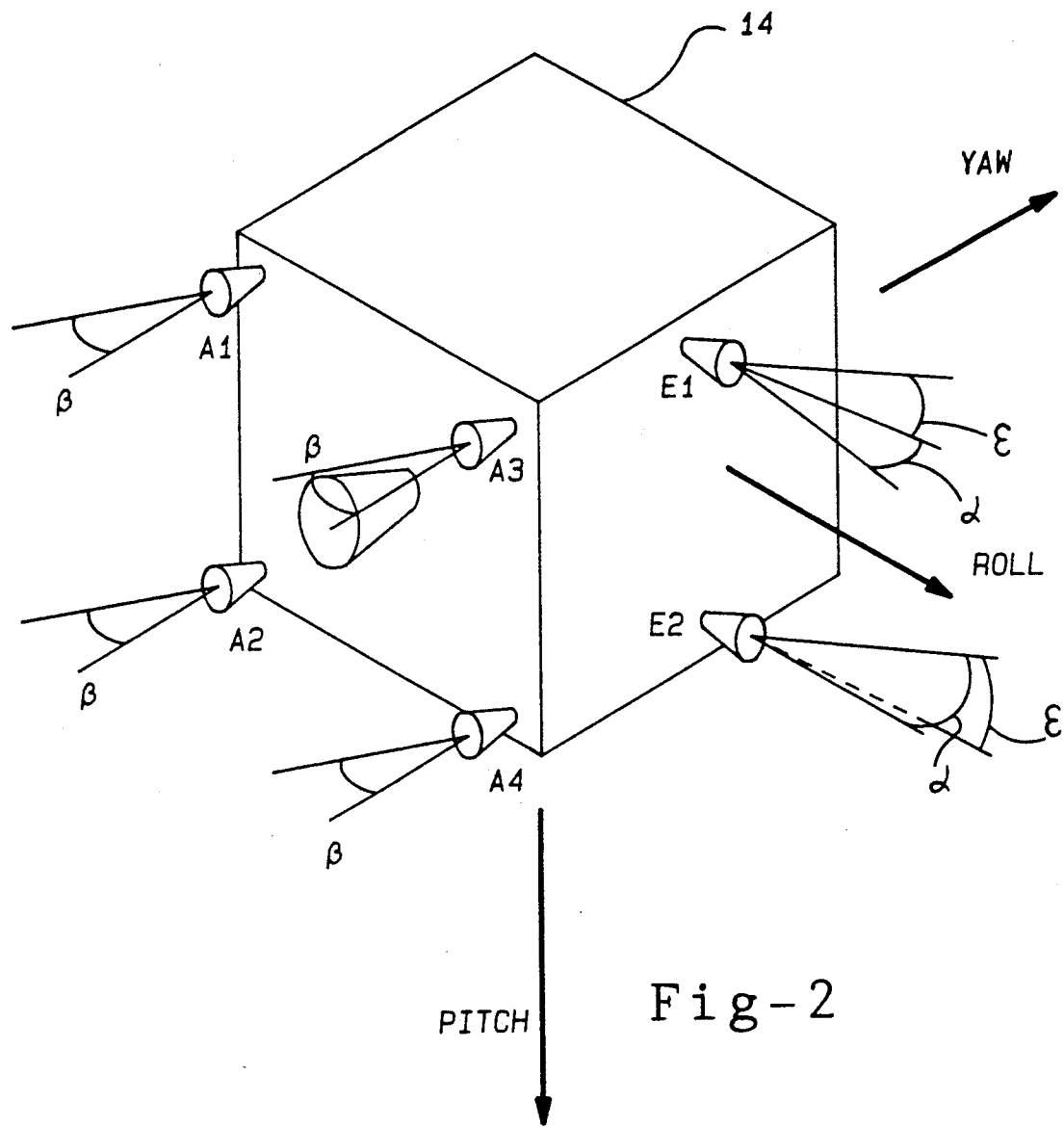
FIG. 2 illustrates a possible thruster configuration for a spacecraft.

Another feature which enhances proportional control is the three axis nature of the system. The improvement obtained is dependent upon thruster configuration. Consider for example the spacecraft 14 shown in FIG. 2 where thrusters E1 and E2 are used for yaw control and thrusters A1, A2, A3 and A4 are used for roll and pitch. (Additional thrusters, not shown, can be added to provide redundant control.) Simulation has shown that angular acceleration commands from orthogonal axes often result in impulse commands to the same thruster. For example, a thruster such as A1 mounted on the extreme corner of the spacecraft produces both a roll and a pitch torque. If both roll and pitch controllers command an angular acceleration resulting in half an impulse bit of thrust from this thruster, the two halves will combine to produce a full impulse bit which is then fired. By comparison, if single axis controllers were used, one axis alone would have to develop sufficient pointing error to command a full impulse. For the thruster configuration shown, this behavior reduces the minimum impulse bit that can be fired in roll and pitch by half, thus enhancing the modulator's ability to approximate proportionally.

Figure 1B:
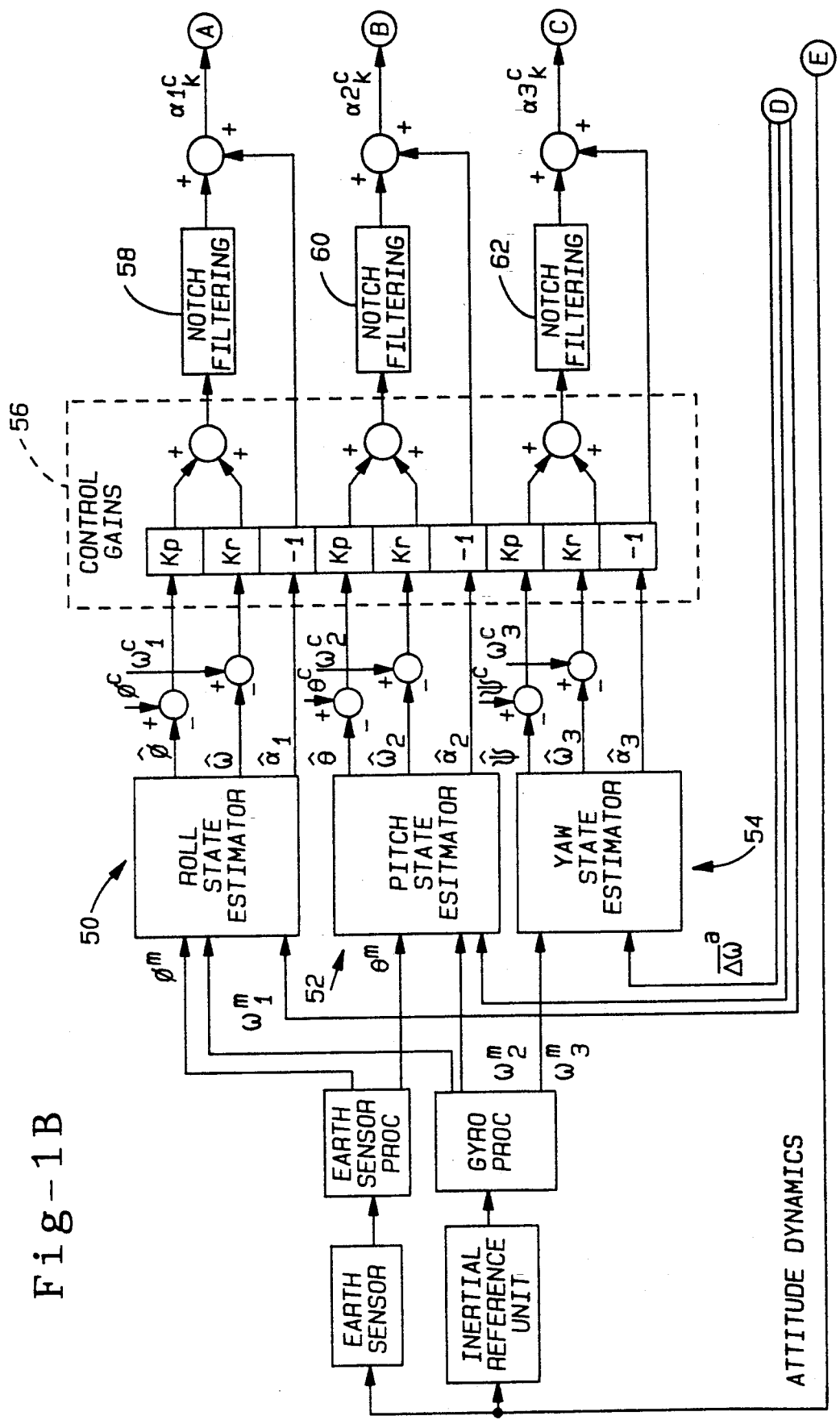

FIG. 1B illustrates one method in which the three axis modulation logic of the invention can be incorporated into an overall control system. Other methods are also possible. In the embodiment shown, three similar controllers 50, 52, 54 are used to generate the angular acceleration commands to the three axis modulation logic. Each controller is comprised of a state estimator which estimates position, rate and acceleration bias in each axis; control gains 56 which combine the estimates; and notch filters 58, 60 and 62 that can be used to create a phase or gain notch to stabilize flexible spacecraft dynamics.

Inputs to the estimators include gyro measurements of rate in all axes, earth sensor measurements of roll and pitch and a feedforward of the actual rate change command $\overline{\Delta\omega}^a$ created by firing the thrusters. Some embodiments may not include gyro inputs for all axes, or may employ some attitude sensor other than an earth sensor, for example, a beacon sensor. Feedforward of the actual rate change is also not essential, but is desirable as it allows lower bandwidth filtering in the state estimators.

In the embodiment shown, the state estimators are limited to third order functions and estimate only rigid body rates. Any notch filtering to compensate for flexible dynamics is performed in a subsequent stage. Other embodiments might combine these functions into a single higher order estimator which estimates flexible mode states as well as rigid body states. The three axis modulation logic of the invention can be used in any of these various embodiments of a three axis control system.

A major problem in fixed-modulation period control of conventional thrusters is the non-linearity in response for duty cycles near (but not at) zero or 100%. This is due to the finite time required for the valves to operate, and is typically characterized by a minimum on-time and minimum off-time. The achievable fixed-modulation duty cycles fall into three categories: 1) Zero percent, 2) Duty cycles in the range from (minimum on-time)/(modulation period) to (minimum off-time)/(modulation period), and 3) 100%. When the control algorithm commands a duty cycle slightly above zero percent (very short on-pulses) or slightly below 100% (very short off-pulses), this cannot be achieved in a single modulation period with thrusters that are nominally continuously on or off. Two solutions are provided to mitigate this nonlinearity: error accumulation and fractional modulation.

Error accumulation mitigates the nonlinearity by achieving the desired effective duty cycle across multiple modulation periods. The error between commanded and actual rate change is accumulated until it exceeds the minimum on-time or off-time, as applicable. A potential drawback of this technique is that it excites the spacecraft at subharmonics of the modulation frequency which can result in unacceptably large attitude oscillations when these subharmonics correspond to spacecraft resonance modes.

Fractional modulation mitigates the nonlinearity by using the attitude control thrusters at nominal duty cycles that are well within the second duty cycle range: significantly above zero percent, yet significantly below 100%. The nominal duty cycle is chosen so that, as the control algorithm requests changes from the nominal duty cycle for attitude control, the requested off-nominal duty cycles will still lie in the achievable duty cycle range, unconstrained by the minimum on-time or off-time. Fractional modulation avoids commanding thruster duty cycles in duty cycle ranges near zero or 100 percent duty cycle.

A simple comparison of fractional and conventional modulation is a south maneuver using four thrusters mounted at the corners of the north face of a cube, each producing a force normal to the north face, directly south.

A typical conventional south maneuver modulation nominally operates one diagonal pair of thrusters continuously on (100% duty cycle), and off-pulses one or the other for attitude control. The other diagonal pair is normally off (zero duty cycle), and one or the other is on-pulsed for attitude control.

A typical fractional modulation south maneuver might nominally operate one diagonal pair of thrusters at a nominal duty cycle of 75%, and the other diagonal pair of thrusters at a nominal duty cycle of 25%.

In the conventional maneuver, all four thrusters are operating at the edge of nonlinearity in two directions. The average force of the nominally 100% on thrusters cannot be decreased by less than the minimum off-time, and cannot be increased at all. The force of the nominally off thrusters cannot be increased by less than the minimum off-time, and cannot be decreased at all.

In the fractional modulation however, the force of all four thrusters can be smoothly increased (e.g., by going from 25 to 26%, or from 75 to 76%) or smoothly decreased. This gives the thruster control a much smoother response, and avoids the subharmonic modulation concerns as well.

The fractional modulation scheme supplements the error accumulation scheme rather than being a substitute. The drawback of the fractional modulation scheme is that fuel efficiency is typically less since the thrusters are usually most efficient at near 100% modulation. Since it only needs to be used when small control authority is required and the resulting subharmonics of the error accumulation scheme are undesirable, the fractional modulation scheme can be reserved for times when the finer control is worth the fuel penalty. The fractional modulation scheme can also be used for cases where, nominally, no thrusters would be on, e.g., two opposing attitude thrusters. Clearly here there is a significant fuel penalty for running both thrusters at 10% duty cycle. However, there are cases, such as when transitioning from a thruster mode to a very low authority control mode, like magnetic torque control where the fuel penalty is minimal (short time period) and the benefit is significant.

The modulation logic of the present invention has several advantages over the prior art. It is an advantage that the modulation logic is applicable to spacecraft with an arbitrary thruster configuration, including a configuration in which individual thrusters or thruster pairs do not produce torques about control axes or even about mutually orthogonal axes. It is another advantage that since the modulation logic works in three axes simultaneously, it offers the potential for fuel optimization by taking advantage of thruster geometry to create torques about multiple control axes with a single thruster pulse. It is to be understood that the invention is not limited to the exact construction or method illustrated and described above, but that various changes and modifications may be made without departing from the spirit and scope of the invention as defined in the following claims.

What is claimed is:

1. Three axis thruster modulation system for a spacecraft having thrusters for attitude control and stationkeeping functions, said modulation system comprising:
   means for generating a rate change command for each axis for execution during an upcoming sample period from predetermined acceleration commands and from any residual unfired rate change from a preceding sample period;
   thruster select and timing logic means for determining simultaneously, from said rate change command for each axis, the thruster selection and the thruster on-times for the upcoming sample period, said logic means also forwarding the thruster selection and thruster on-times to thruster output processing means for firing of the thrusters during the upcoming sample period;
   means for computing an actual rate change estimate for the upcoming sample period based on the thruster selection and thruster on-times; and
   means for retaining a residual unfired rate change for each axis from the upcoming sample period for use in generating a rate change command for a subsequent sample period following said upcoming sample period.

2. The modulation system of claim 1 further comprising limiter means for limiting said residual unfired rate change from said preceding sample period to a value not greater than a maximum rate change achievable during a single sample period.

3. The modulation system of claim 1 further comprising means for feed forwarding said computed actual rate change commands for the upcoming sample period to a controller means for use in generating acceleration commands for said subsequent sample period.

4. The modulation system of claim 1 wherein said rate change command is generated by multiplying said predetermined acceleration commands by a predetermined time length of said sample period and adding thereto any residual unfired rate change from prior sample periods.

5. The modulation system of claim 1 wherein said residual unfired rate change is generated by subtracting the computed actual rate change estimate from the rate change command.

6. The modulation system of claim 1 wherein said thruster select and timing logic means commands fractional thruster duty cycles greater than zero and less than 100 percent thruster duty cycle.

7. The modulation system of claim 1 wherein said thruster select and timing logic means includes means for rounding thruster on-times shorter than a minimum value to either zero or to said minimum value.

8. The modulation system of claim 1 wherein said thruster select and timing logic means includes means for choosing between redundant thrusters capable of performing equivalent rate changes.

9. A spacecraft having three mutually orthogonal control axes comprising:
   a plurality of thrusters capable of providing torque impulses in both directions about each of said axes;
   means for generating acceleration commands for each axis for performing spacecraft attitude control and stationkeeping functions;
   modulation means for generating thruster selections and thruster on-times for execution during an upcoming sample period based on said acceleration commands, said modulation means including means for generating a rate change command for each axis for execution during an upcoming sample period by multiplying said acceleration commands by a time length of said sample period and adding thereto any residual unfired rate change from a preceding sample period;
   said modulation means including thruster-select and timing logic means for determining simultaneously from said rate change command the thruster selection and the thruster on-times for the upcoming sample period, said logic means also forwarding the thruster selection and thruster on-times to thruster output processing means for firing of the thrusters during the upcoming sample period; and said modulation means further including means for computing an actual rate change estimate for the upcoming sample period based on the thruster selection and thruster on-times and means for generating a residual unfired rate change for each axis for use in generating a rate change command for a subsequent sample period by comparing the rate change command for the upcoming sample period with the computed actual rate change estimate for the upcoming sample period.

10. The spacecraft of claim 9 wherein said modulation means further comprises means for limiting said residual unfired rate change from the preceding sample period to a value not greater than a maximum rate change achievable during a single sample period.

11. The spacecraft of claim 10 wherein said modulation means further includes means for feed forwarding the said actual rate change for the upcoming sample period to said acceleration command generating means for use in generating acceleration commands for said subsequent sample period.

12. The spacecraft of claim 9 wherein said plurality of thrusters consists of ten thrusters.

13. A modulation method for selecting thrusters and thruster on-times from angular acceleration commands to accomplish attitude control and stationkeeping operations in a spacecraft having thrusters producing full torquing capability about three spacecraft control axes, said method comprising the steps of:

receiving acceleration commands for each axis;

generating a rate change command for each axis for execution during an upcoming sample period by multiplying said acceleration commands by a time length of said upcoming sample period and adding thereto any residual unfired rate change from a preceding sample period;

selecting thrusters and determining thruster on-times from the generated rate change command using spacecraft mass properties, thruster placement and alignment relative to the spacecraft center of mass and thruster minimum on-times and impulse verses time characteristics for the thrusters;

forwarding the thruster selection and thruster on-times to thruster output processing means for firing of the thrusters during the upcoming sample period;

determining an estimate of the actual rate change for the upcoming sample period based on a thruster selection and thruster on-times; and generating a residual unfired rate change for each axes from the upcoming sample period for use in generating a rate change command for a subsequent sample period following said upcoming sample period.

14. The method of claim 13 further comprising the step of limiting the residual unfired rate change from said preceding sample period to a value not greater than a maximum rate change achievable during a single sample period.

15. The method of claim 13 further comprising the step of feedforwarding said actual rate change for the upcoming sample period to a controller for use in generating acceleration commands for said subsequent sample period.

16. A modulation method for selecting thrusters and thruster on-times for a spacecraft having thrusters for producing torques in three spacecraft control axes, said method comprising the steps of:

generating a rate change command for each axis for execution during an upcoming sample period from predetermined acceleration commands and from any residual unfired rate change from a preceding sample period;

determining simultaneously, from said rate change command for each axis, the thruster selection and the thruster on-times for the upcoming sample period;

forwarding the thruster selection and thruster on-times to thruster output processing means for firing of the thrusters during the upcoming sample period;

computing an actual rate change estimate for the upcoming sample period based on the thruster selection and thruster on-times; and retaining a residual unfired rate change for each axis from the upcoming sample period for use in generating a rate change command for a subsequent sample period following said upcoming sample period.

17. The method of claim 16 further comprising the step of limiting said residual unfired rate change from said preceding sample period to a value not greater than a maximum rate change achievable during a single sample period.

18. The method of claim 16 further comprising the step of feed forwarding said computed actual rate change commands for the upcoming sample period to a controller for use in generating acceleration commands for said subsequent sample period.

19. The method of claim 16 further comprising the step of generating a residual unfired rate change by subtracting the computed actual rate change estimate from the rate change command.

* * * * *